UNITED STATES PATENT OFFICE.

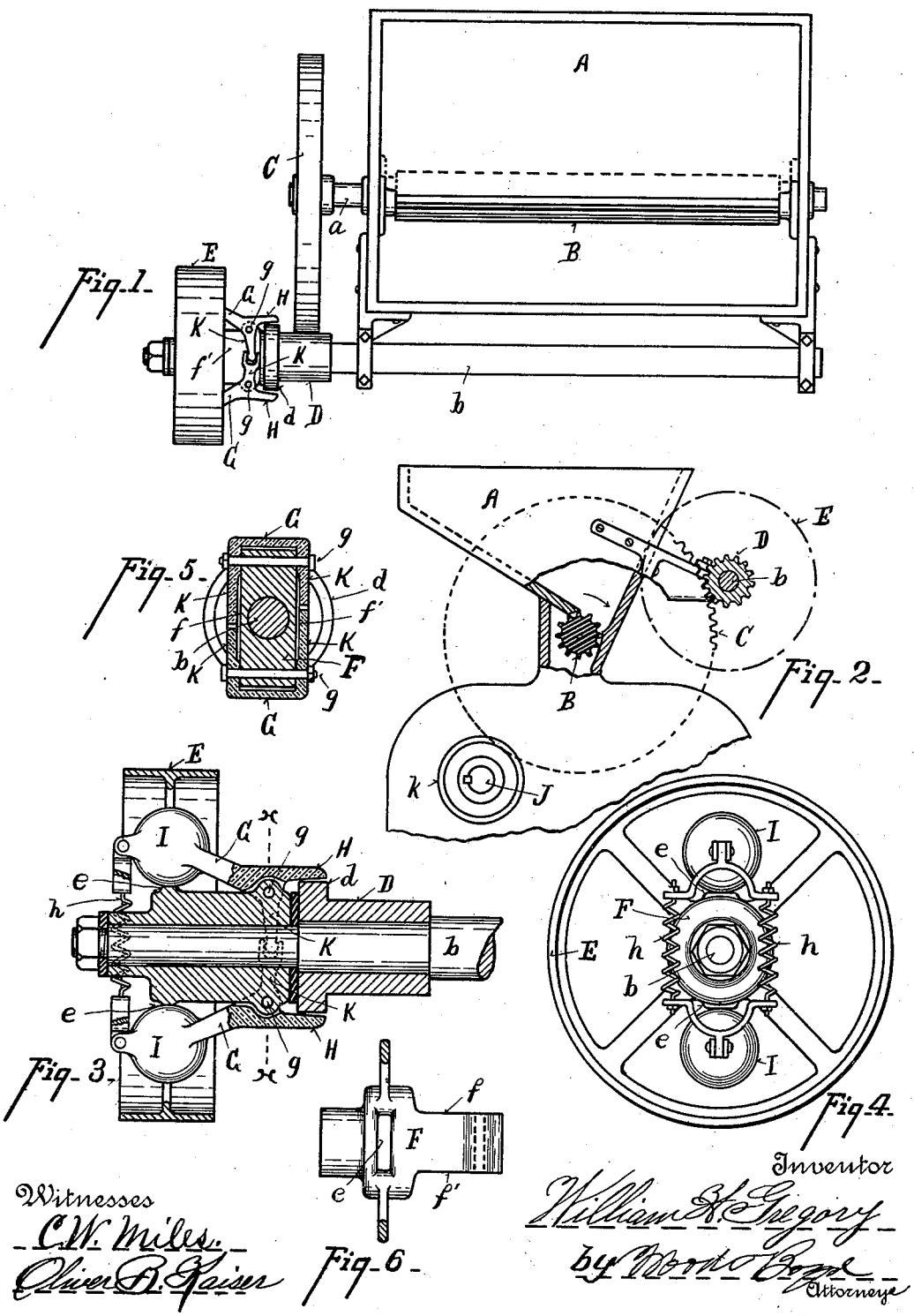

WILLIAM H. GREGORY, OF LAWRENCEBURG, KENTUCKY.

FEED-CONTROLLING MECHANISM FOR GRAIN-CRUSHING MILLS.

SPECIFICATION forming part of Letters Patent No. 621,073, dated March 14, 1899.

Application filed February 10, 1898. Serial No. 669,806. (No model.)

*To all whom it may concern:*

Be it known that I, WILLIAM H. GREGORY, residing at Lawrenceburg, in the county of Anderson and State of Kentucky, have invented certain new and useful Improvements in Feed-Controlling Mechanism for Grain-Crushing Mills, of which the following is a specification.

The object of my invention is to provide mechanism for operating the feed device of a rolling-mill whereby the feed device is only operated when the crushing-rolls have attained a predetermined speed.

The features of my invention are more fully set forth in the description of the accompanying drawings, making a part of this specification, in which—

Figure 1 is a top plan view of my device. Fig. 2 is an end elevation of the same, partly in section. Fig. 3 is a central vertical section of the governor pulley and shaft, partly in elevation. Fig. 4 is an end view of the same. Fig. 5 is a section on line $x\ x$, Fig. 3. Fig. 6 is a detailed view of the hub of the governor-pulley.

For convenience of illustration I have shown my invention as applied to the positive feed-roller of a crushing-mill, though it could be applied to a vibrating feed or other form of feed, if desired, equally well.

A represents the hopper of a grain-crushing mill.

B represents the feed-roller, located in the throat of the hopper. It is preferably of the corrugated form.

$a$ represents the shaft of the feed-roller, on the end of which is the driving friction-wheel C.

$b$ represents the shaft upon which the mechanism is mounted for transmitting power to the friction-wheel C.

D represents a friction-wheel preferably with a raised disk flange $d$ on its outer end. This wheel is loosely mounted upon shaft $b$ and is in contact with wheel C.

E represents a governor-pulley on the end of shaft $b$. Said governor-pulley is provided with a horizontally-extended hub portion F. This hub end is flattened upon each side at $f\ f$. To the extended end of this hub and upon the said flattened surfaces are pivoted the arms of a pair of governor-balls I, the balls or weights preferably resting upon the lugs $e\ e$ between the spokes of the pulley E. The arms G of these governor-balls are provided with U-shaped bracket-arms K, which straddle the flattened hub portions $f\ f$ and are pivoted at $g\ g$ to said hub. Said governor-arms are also provided with extensions or lugs H from their pivot-points, the ends of which when the balls are drawn together rest normally out of contact with the flange $d$ of the friction-wheel D. These arms K are connected with each other by the end of one projecting into a fork upon the end of the other. As the balls are thrown outward by the centrifugal force of the revolution of the pulley E, the extensions or lugs H will move inward until the speed has been attained at which it is desired to operate the feed device, when the lugs H will clutch the flange $d$ and through wheel D drive the wheel C and operate the feed device. In Fig. 5 the attachment of the bracket-arms K to the flattened hub F is shown. This is for the purpose of causing the balls to balance each other at all points of their revolution and to insure a uniform pivotal movement of the two balls. The governor-pulley arms being pivoted to the hub at $g\ g$ and provided with inwardly-extending U-shaped brackets embracing the platen sides of the hub allow the ends of said bracket-arms to travel on the hub, intercepting each other's paths of travel in their movement. The balls are thus supported by the bracket-arms upon each side of the hub. This gives a secure attachment of the balls to the pulley and insures a uniform and simultaneous movement of the balls relative to each other and to the hub, as the inwardly-extended bracket-arms embracing the platen-hub travel on and are guided by the platen-faces thereof, necessarily limiting the travel of the balls in the manner described.

$h\ h$ represent springs secured to the governor-balls to determine the speed at which the balls will be thrown out and to provide a uniform movement.

J represents the end of the shaft of one of the crushing-rolls, upon the end of which is a pulley $k$, which transmits power by means of a belt to pulley E.

It will readily be seen that the governor-balls may be adjusted so that their extended ends will clutch the friction-wheel at any predetermined speed and engage the same when such speed is attained and automatically release the same when the speed is diminished, so that the grain will be fed to the mill only when the speed of the rollers is swift enough to prevent any danger of clogging.

I preferably employ a horizontal governor, and the power may be transmitted from wheel D to C either by friction, as shown in Fig. 1, by gear, as shown in Fig. 2, or by any well-known power-transmitting mechanism.

The distance of the movement of the governor-balls at a given speed of the governor-pulley may be varied by adjusting the tension of the springs connecting the balls.

Several important advantages are derived from the use of my clutch-governor automatic-feed operator. One of the greatest difficulties experienced with the corrugated-roller mills is that whenever the crushing-rolls slacken down in speed from any cause the feed device will keep on feeding grain to the crushing-rolls, and these rolls being unable to reduce all the grain fed to them while revolving at a low speed will clog up and stop, and the grain has to be dug out and the rolls thoroughly cleaned before the mill can be run again. This occasions a loss of time and waste of grain. With my device, however, the speed of the crushing-rolls must be sufficient to reduce all the grain before the feeding device is operated, and likewise any diminishing of the speed from any cause whatsoever below the predetermined point immediately automatically disengages the feeding device from operation and so effectually prevents all danger of stopping or clogging up the several rolls.

Having described my invention, I claim—

1. In combination with the crushing-rollers of a grain-mill and a feeding device located in the hopper thereof, a governor-pulley operated thereby and loosely journaled upon a stationary shaft, a power-transmitting wheel loosely journaled on the same shaft, a pair of governor-balls the arms of which are pivoted to the hub of said governor-pulley, the said arms having inward extensions embracing the hub, and outward extensions being adapted to clutch the said power-transmitting wheel at a predetermined point in the outward movement of the balls, and means for transmitting power from said wheel to said feeding device in the hopper of the mill to operate the same, substantially as specified.

2. In combination with the crushing-rolls of a grain-mill and a feeding device located in the hopper thereof, a governor-pulley journaled upon a stationary shaft, said pulley being provided with a horizontally-extending hub flattened upon two sides, means for operating said pulley from said rolls, a power-transmitting wheel also loosely journaled on said stationary shaft, a friction-wheel formed on said transmitting-wheel, a pair of governor-ball arms provided with balls, said arms being pivoted to the flattened faces of said hub at points between the ends of said arms, the inner ends of said arms being adapted to clutch the said friction-wheel as the governor-balls are thrown outward by the revolution of the governor-pulley, and means for conveying power from said transmitting-wheel to the said feeding device located in the hopper of the mill, substantially as specified.

3. In combination with the crushing-rolls of a grain-mill and a feeding device located in the hopper thereof, a governor-pulley loosely journaled upon a stationary shaft, the said pulley being provided with an extended hub flattened upon two sides, governor-ball arms pivoted to said flattened hub, said arms being provided with extensions at their inner ends adapted to engage a friction-wheel and inwardly-extending bracket-arms embracing said flattened hub, the said friction-wheel journaled upon said stationary shaft, springs connecting the governor-balls with each other, power-transmitting mechanism connecting said friction-wheel with the said feed device located in the hopper, and adapted to operate the same when the friction-wheel is clutched by the governor-arm clutches, substantially as specified.

4. In combination with the crushing-rolls of a grain-mill and a grain-feeding device, a governor-pulley journaled upon a shaft, an extended hub formed on said pulley and flattened upon two sides, a pair of governor-arms provided with balls pivoted to the extended hub, a pair of U-shaped bracket-arms formed on said arms and straddling the flattened portions of said hub, a pair of clutch extensions formed on the inner ends of said arms, a power-transmitting wheel journaled on said shaft and adapted to be engaged by said governor clutch-arms, mechanism connecting said power-transmitting wheel with the feeding device, and adapted to operate the same when the said transmitting-wheel is engaged by the governor clutch-arms, substantially as specified.

5. In combination with the crushing-rolls of a grain-mill, and a feeding device therefor, a governor-pulley journaled upon a shaft, an extended hub formed on said pulley, with two flattened sides, means for driving said pulley from said crushing-rolls, a pair of governor-arms provided with governor-balls pivoted to the flattened sides of said extended hub, the balls adapted to rest when collapsed between the spokes of said pulley, a U-shaped bracket-arm formed on each governor-arm extending inward and straddling the said extended hub, a clutch projection formed on the inner end of each governor-arm, a power-transmitting wheel journaled on said shaft, a raised flange formed on said transmitting-wheel adapted to be engaged by said governor clutch-arms at a predetermined point in the outward travel of the governor-balls, and mechanism connecting said power-transmitting wheel with said feed device, and adapted to operate the same, substantially as specified.

6. In a grain-crushing mill, a governor-pulley mounted upon a horizontal shaft and adapted to be driven by power mechanism, said governor-pulley being provided with a horizontally-extended hub flattened upon two sides, lugs formed on said hub and adapted to receive the governor-balls when at rest, springs connecting said governor-balls to each other, a loosely-journaled friction-transmitting wheel mounted on said horizontal shaft, means for transmitting power from the same to the crushing-roll, clutch-arms extended from the governor-arms toward the friction-transmitting wheel and adapted to clutch the same, and U-shaped bracket-arms inwardly extended from said governor-arms and embracing the flattened sides of said hub, substantially as specified.

In testimony whereof I have hereunto set my hand.

WM. H. GREGORY.

Witnesses:
  J. W. GAINES,
  S. L. RUDDE.